UNITED STATES PATENT OFFICE.

WILLIAM HENLEY, OF ALAMEDA, ASSIGNOR TO THE CELERY BEEF AND IRON EXTRACT COMPANY, OF SAN FRANCISCO, CALIFORNIA.

NUTRITIVE TONIC.

SPECIFICATION forming part of Letters Patent No. 361,358, dated April 19, 1887.

Application filed February 2, 1885. Serial No. 154,731. (No specimens.)

*To all whom it may concern:*

Be it known that I, WILLIAM HENLEY, a citizen of the United States, residing in the city of Alameda, county of Alameda, and State of California, have discovered and invented an Improved Composition of Matter for Medicinal Purposes; and I do hereby declare that the following is a full, clear, and exact description of the same.

The nature of my invention aforesaid consists in producing a new and useful medicinal compound by combining together extracts of celery, beef, and iron, after the manner and in about the proportions given below.

I first prepare an extract of celery by percolation from about two (2) pounds of celery-seed, using with such quantity about one gallon of diluted spirits. Any fluid extract of this substance might be used; but I prefer to make my own extract. I prepare the next ingredient by taking one pound of extract of beef—such as Liebig's or Valentine's—to one gallon of hot water. Of this ingredient I prepare five gallons. For this proportion of celery extract and beef extract I proceed to take five ounces of the pyrophosphate of iron and dissolve it in one-half gallon of hot water. Other preparations of iron could be used; but I prefer the pyrophosphate. To the extract of celery I then add three gallons of simple sirup, and to this mixture add the extract of beef prepared as before stated. Five gallons of best California brandy and twelve gallons of neutral refined spirits are then added to the mixture, after which the iron previously prepared as aforesaid. The whole mixture is finally increased to sixty gallons by adding to it the required quantity of hot water. A small quantity of some flavoring extract—such as vanilla or lemon—may then be added, if required, although that is not essential. After being thoroughly mixed and filtered the product is bottled for use.

A dose of the compound would be from a table-spoonful to a wine glassful, according to the constitution of the party taking it and the requirements of the case.

Having thus fully described my invention, what I claim, and desire to secure by Letters Patent, is—

The herein described medicinal and dietetic compound as a tonic and restorative in nervous complaints, consisting of the described extracts of celery and beef combined with iron and suitable stimulant, as stated.

WILLIAM HENLEY. [L. S.]

Witnesses:
EDWARD E. D. CARR,
JNO. L. TAGGARD.